(12) United States Patent
Leahy et al.

(10) Patent No.: US 8,767,508 B2
(45) Date of Patent: Jul. 1, 2014

(54) USING SEISMIC P AND S ARRIVALS TO DETERMINE SHALLOW VELOCITY STRUCTURE

(75) Inventors: Garrett M. Leahy, Houston, TX (US); Rebecca L. Saltzer, Houston, TX (US); Christopher J. Dicaprio, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 427 days.

(21) Appl. No.: 13/172,530

(22) Filed: Jun. 29, 2011

(65) Prior Publication Data

US 2012/0043091 A1 Feb. 23, 2012

Related U.S. Application Data

(60) Provisional application No. 61/374,888, filed on Aug. 18, 2010.

(51) Int. Cl.
*G01V 1/28* (2006.01)
*G01V 1/30* (2006.01)

(52) U.S. Cl.
CPC ............... *G01V 1/282* (2013.01); *G01V 1/303* (2013.01)
USPC .................................. 367/73; 702/18; 367/50

(58) Field of Classification Search
USPC .................................. 367/50, 73; 702/13, 18
See application file for complete search history.

(56) References Cited

U.S. PATENT DOCUMENTS

| | | | |
|---|---|---|---|
| 3,812,457 | A | 5/1974 | Weller |
| 3,864,667 | A | 2/1975 | Bahjat |
| 4,159,463 | A | 6/1979 | Silverman |
| 4,168,485 | A | 9/1979 | Payton et al. |
| 4,545,039 | A | 10/1985 | Savit |
| 4,562,540 | A | 12/1985 | Devaney |
| 4,575,830 | A | 3/1986 | Ingram et al. |
| 4,594,662 | A | 6/1986 | Devaney |
| 4,636,956 | A | 1/1987 | Vannier et al. |
| 4,675,851 | A | 6/1987 | Savit et al. |
| 4,686,654 | A | 8/1987 | Savit |
| 4,707,812 | A | 11/1987 | Martinez |

(Continued)

FOREIGN PATENT DOCUMENTS

| | | |
|---|---|---|
| EP | 1 094 338 | 4/2001 |
| EP | 1 746 443 | 1/2007 |

(Continued)

OTHER PUBLICATIONS

Abt, D.L. et al. (2010), "North American lithospheric discontinuity structured imaged by Ps and Sp receiver functions", *J. Geophys. Res.*, 24 pgs.

(Continued)

*Primary Examiner* — Ian J Lobo
(74) *Attorney, Agent, or Firm* — ExxonMobil Upstream Research Company Law Dept.

(57) ABSTRACT

Method for estimating a model of seismic velocity in a subsurface region from seismic data (31) recorded on 3-component instruments. The method measures the apparent incidence angle (32) of a seismic wave observed at a surface as a function of wave frequency. This apparent angle is converted to an effective velocity as a function of frequency (33), which is then inverted (34) to obtain a subsurface velocity model.

22 Claims, 5 Drawing Sheets

(56) References Cited

U.S. PATENT DOCUMENTS

| | | | |
|---|---|---|---|
| 4,715,020 A | | 12/1987 | Landrum, Jr. |
| 4,766,574 A | * | 8/1988 | Whitmore et al. ............... 367/50 |
| 4,780,856 A | | 10/1988 | Becquey |
| 4,823,326 A | | 4/1989 | Ward |
| 4,924,390 A | | 5/1990 | Parsons et al. |
| 4,953,657 A | | 9/1990 | Edington |
| 4,969,129 A | | 11/1990 | Currie |
| 4,982,374 A | | 1/1991 | Edington et al. |
| 5,260,911 A | | 11/1993 | Mason et al. |
| 5,570,321 A | * | 10/1996 | Bernitsas ....................... 367/38 |
| 5,677,893 A | | 10/1997 | de Hoop et al. |
| 5,715,213 A | | 2/1998 | Allen |
| 5,717,655 A | | 2/1998 | Beasley |
| 5,719,821 A | | 2/1998 | Sallas et al. |
| 5,721,710 A | | 2/1998 | Sallas et al. |
| 5,790,473 A | | 8/1998 | Allen |
| 5,798,982 A | | 8/1998 | He et al. |
| 5,822,269 A | | 10/1998 | Allen |
| 5,838,634 A | | 11/1998 | Jones et al. |
| 5,852,588 A | | 12/1998 | de Hoop et al. |
| 5,878,372 A | | 3/1999 | Tabarovsky et al. |
| 5,920,828 A | | 7/1999 | Norris et al. |
| 5,924,049 A | | 7/1999 | Beasley et al. |
| 5,999,488 A | | 12/1999 | Smith |
| 5,999,489 A | | 12/1999 | Lazaratos |
| 6,014,342 A | | 1/2000 | Lazaratos |
| 6,021,094 A | | 2/2000 | Ober et al. |
| 6,028,818 A | | 2/2000 | Jeffryes |
| 6,058,073 A | | 5/2000 | VerWest |
| 6,125,330 A | | 9/2000 | Robertson et al. |
| 6,219,621 B1 | | 4/2001 | Hornbostel |
| 6,311,133 B1 | | 10/2001 | Lailly et al. |
| 6,317,695 B1 | | 11/2001 | Zhou et al. |
| 6,327,537 B1 | | 12/2001 | Ikelle |
| 6,374,201 B1 | | 4/2002 | Grizon et al. |
| 6,388,947 B1 | | 5/2002 | Washbourne et al. |
| 6,480,790 B1 | | 11/2002 | Calvert et al. |
| 6,522,973 B1 | | 2/2003 | Tonellot et al. |
| 6,545,944 B2 | | 4/2003 | de Kok |
| 6,549,854 B1 | | 4/2003 | Malinverno et al. |
| 6,574,564 B1 | | 6/2003 | Lailly et al. |
| 6,662,147 B1 | | 12/2003 | Fournier et al. |
| 6,665,615 B2 | | 12/2003 | Van Riel et al. |
| 6,687,619 B2 | | 2/2004 | Moerig et al. |
| 6,687,659 B1 | | 2/2004 | Shen |
| 6,704,245 B2 | | 3/2004 | Becquey |
| 6,714,867 B2 | | 3/2004 | Meunier |
| 6,754,590 B1 | | 6/2004 | Moldoveanu |
| 6,766,256 B2 | | 7/2004 | Jeffryes |
| 6,826,486 B1 | | 11/2004 | Malinverno |
| 6,836,448 B2 | | 12/2004 | Robertsson et al. |
| 6,842,701 B2 | | 1/2005 | Moerig et al. |
| 6,859,734 B2 | | 2/2005 | Bednar |
| 6,865,487 B2 | | 3/2005 | Charron |
| 6,865,488 B2 | | 3/2005 | Moerig et al. |
| 6,876,928 B2 | | 4/2005 | Van Riel et al. |
| 6,882,938 B2 | | 4/2005 | Vaage et al. |
| 6,901,333 B2 | | 5/2005 | Van Riel et al. |
| 6,903,999 B2 | | 6/2005 | Curtis et al. |
| 6,944,546 B2 | | 9/2005 | Xiao et al. |
| 6,947,843 B2 | | 9/2005 | Fisher et al. |
| 6,999,880 B2 | | 2/2006 | Lee |
| 7,046,581 B2 | | 5/2006 | Calvert |
| 7,050,356 B2 | | 5/2006 | Jeffryes |
| 7,072,767 B2 | | 7/2006 | Routh et al. |
| 7,092,823 B2 | | 8/2006 | Lailly et al. |
| 7,110,900 B2 | | 9/2006 | Adler et al. |
| 7,230,879 B2 | | 6/2007 | Herkenhoff et al. |
| 7,271,747 B2 | | 9/2007 | Baraniuk et al. |
| 7,330,799 B2 | | 2/2008 | Lefebvre et al. |
| 7,373,251 B2 | | 5/2008 | Hamman et al. |
| 7,373,252 B2 | | 5/2008 | Sherrill et al. |
| 7,376,046 B2 | | 5/2008 | Jeffryes |
| 7,436,734 B2 | | 10/2008 | Krohn |
| 7,480,206 B2 | | 1/2009 | Hill |
| 7,584,056 B2 | | 9/2009 | Koren |
| 7,602,670 B2 | | 10/2009 | Jeffryes |
| 7,646,924 B2 | | 1/2010 | Donoho |
| 7,672,194 B2 | | 3/2010 | Jeffryes |
| 7,675,815 B2 | | 3/2010 | Saenger et al. |
| 7,679,990 B2 | | 3/2010 | Herkenhoff et al. |
| 7,715,985 B2 | | 5/2010 | Van Manen et al. |
| 7,725,266 B2 | | 5/2010 | Sirgue et al. |
| 7,835,072 B2 | | 11/2010 | Izumi |
| 7,840,625 B2 | | 11/2010 | Candes et al. |
| 2002/0120429 A1 | | 8/2002 | Ortoleva |
| 2002/0183980 A1 | | 12/2002 | Guillaume |
| 2007/0274155 A1 | | 11/2007 | Ikelle |
| 2008/0175101 A1 | | 7/2008 | Saenger et al. |
| 2008/0306692 A1 | | 12/2008 | Singer et al. |
| 2009/0010104 A1 | * | 1/2009 | Leaney ........................... 367/47 |
| 2009/0248308 A1 | | 10/2009 | Luling |
| 2009/0259406 A1 | | 10/2009 | Khadhraoui et al. |
| 2010/0008184 A1 | | 1/2010 | Hegna et al. |
| 2010/0018718 A1 | | 1/2010 | Krebs et al. |
| 2010/0042391 A1 | * | 2/2010 | Shin ................................ 703/6 |
| 2010/0142316 A1 | | 6/2010 | Keers et al. |
| 2011/0267921 A1 | * | 11/2011 | Mortel et al. .................. 367/25 |

FOREIGN PATENT DOCUMENTS

| | | |
|---|---|---|
| GB | 2 390 712 | 1/2004 |
| GB | 2 391 665 | 2/2004 |
| WO | WO 2007/046711 | 4/2007 |
| WO | WO 2008/042081 | 4/2008 |
| WO | WO 2008/123920 | 10/2008 |
| WO | WO 2009/067041 | 5/2009 |
| WO | WO 2009/117174 | 9/2009 |

OTHER PUBLICATIONS

Akerberg, P., et al. (2008), "Simultaneous source separation by sparse radon transform," 78th Annual International Meeting, SEG, Expanded Abstracts, pp. 2801-2805.

Abt, D.L. et al. (2010), "North American lithospheric discontinuity structure by Ps and Sp receiver functions," *J. Geophys. Res.* 115, 24 pgs.

Dziewonski, A. et al. (1981), "Preliminary Reference Earth Model," *Phys. Earth Planet. Int.* 25(4), pp. 297-356.

Esmersoy, C. (1990), "Inversion of P and SV waves from multicomponent offset vertical seismic profiles," *Geophysics* 55(1), pp. 39-50.

Kennett, B.L.N. (1991), "The removal of free surface interactions from three-component seismograms", *Geophys. J. Int.* 104, pp. 153-163.

Park, J. et al. (1987), "Frequency Dependent Polarization Analysis of High-Frequency Seismograms," *J. of Geophysical Research* 92(B12), pp. 12,664-12,674.

Sheriff, R.E. et al. (1982), "Exploration Seismology," pp. 134-135.

Xia, J. et al. (1999), "Estimation of near-surface shear-wave velocity by inversion of Rayleigh waves," *Geophysics* 64(3), pp. 691-700.

\* cited by examiner

USING SEISMIC P AND S ARRIVALS TO DETERMINE SHALLOW VELOCITY STRUCTURE

CROSS REFERENCE TO RELATED APPLICATION

This application claims the benefit of U.S. Provisional Patent Applications 61/374,888, filed 18 Aug. 2010, entitled USING SEISMIC P AND S ARRIVALS TO DETERMINE SHALLOW VELOCITY STRUCTURE, the entirety of which is incorporated by reference herein.

FIELD OF THE INVENTION

The invention relates generally to the field of geophysical prospecting and, more particularly to seismic data processing. Specifically the invention is a method for using P and S arrivals to determine shallow velocity structure.

BACKGROUND

Active source seismic reflection data are commonly used in hydrocarbon exploration to remotely infer subsurface geologic structure and rock properties. A major advantage of these data are that the source and receiver locations can be strictly controlled, thereby allowing very detailed imaging of the subsurface. However, reflected signals from strata are recorded as time series, and must be migrated to depth in order to infer geologic structure. This process requires a reliable seismic velocity reference model, whose accuracy directly impacts the accuracy of the inferred structure.

A common approach to building migration models is to perform Normal Move-out Analysis or travel-time analysis on the seismic reflection data [e.g., Sheriff and Geldart, *Exploration Seismology*, Cambridge University Press, 134-135 (1982)]. In complex regions such as fold-thrust belts, regions with basalt sills and dykes, or intruding salt bodies, the quality of these models is often poor, leading to poor migration of seismic reflections and therefore inaccurately inferred structure.

Figure 1:
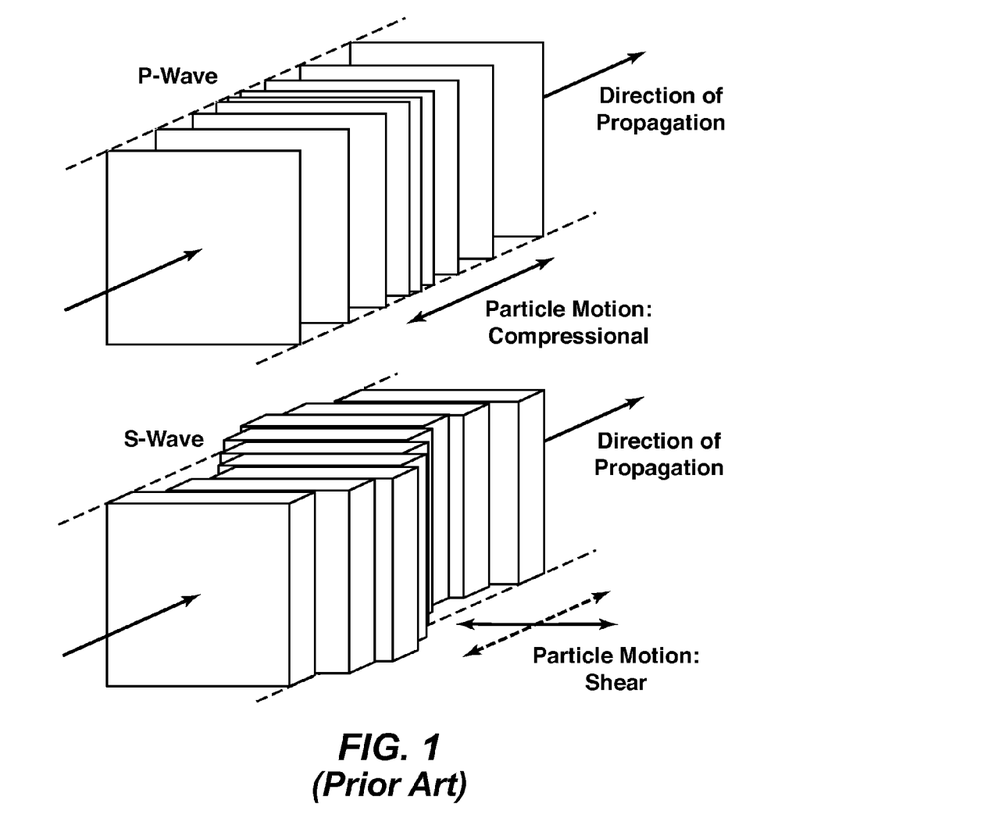
FIG. 1 illustrates particle motion for P-waves and S-waves.

The present invention is a new method for using seismic waves to obtain a subsurface velocity model for use in hydrocarbon exploration. Seismic energy may be generated either actively (e.g. by explosions or vibrations) or passively (e.g. by earthquakes or landslides). Seismic energy in the Earth travels in the form of either compressional waves (P waves) or shear waves (S waves). P waves can be identified by the presence of particle motion in the direction of wave propagation; whereas S wave particle motion is perpendicular to the direction of wave propagation (FIG. 1). P and S waves travel at different speeds through the Earth, and these speeds are important indicators of subsurface properties such as lithology, porosity, or fluid content.

Figure 2:
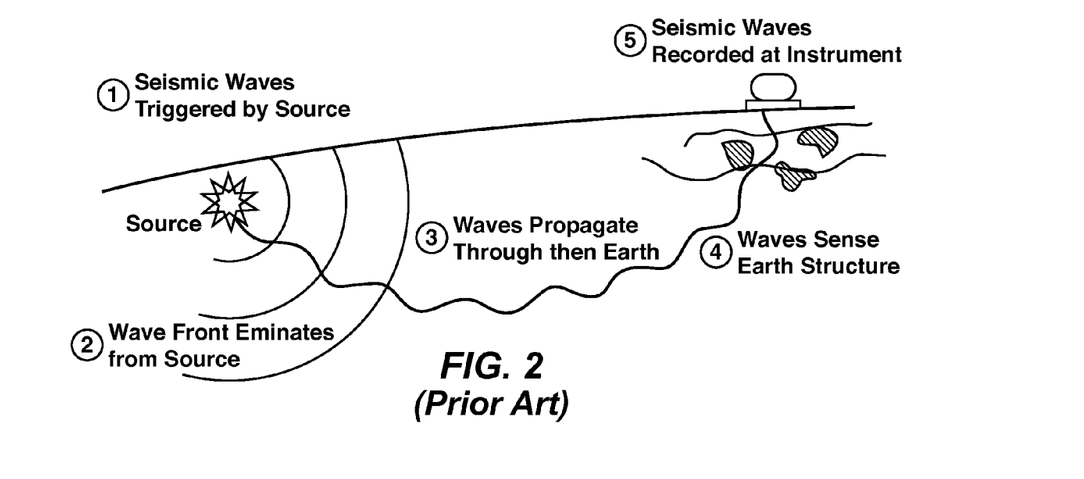
FIG. 2 is a schematic diagram illustrating seismic wave propagation through the subsurface from a source location to a receiver station.

FIG. 2 is a schematic diagram of the process of seismic exploration. Seismic waves can be observed at any geographic location using a purpose-built recording instrument (for example, a geophone or seismometer). These instruments are designed to record particle displacements or acceleration, and require three independent (typically orthogonal) components to fully describe particle motion at the Earth's surface.

Seismic energy observed at a deployed instrument (commonly referred to as a station) is recorded in the "station reference frame." For consistency, stations are usually carefully positioned and leveled in the field such that the station reference frame corresponds to a standard geographic reference frame, with components pointing in the North (N), East (E), and vertical (Z) directions.

SUMMARY

In one embodiment, the invention is a method for estimating a model of seismic velocity in a subsurface region from seismic data recorded on 3-component instruments, comprising using a computer to: (a) determine a wave front incidence angle for a selected seismic event in the seismic data at a plurality of frequencies or frequency bands; (b) determine a frequency dependent velocity from the wave front incidence angle for each frequency or frequency band; and (c) infer a depth-dependent velocity by inverting the frequency-dependent velocity.

BRIEF DESCRIPTION OF THE DRAWINGS

The present invention and its advantages will be better understood by referring to the following detailed description and the attached drawings in which.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION

The present inventive method relies on two fundamental properties of seismic waves. The first property is that waves propagate at speeds representing the average seismic velocity of the material the wave front passes through during one wave period. This means that high-frequency waves with shorter periods are sensitive to smaller-scale structure than low-frequency waves with long periods. The second property is that the inclination of the ray $\theta$ and velocity of the material (V) are related to a constant (p) called the ray parameter. The ray parameter represents the apparent slowness of the wavefront in a horizontal direction, which is why p is sometimes called the horizontal slowness of the ray. Together, these two properties imply that, for a given wave front with ray parameter p traveling through a heterogeneous Earth, waves of different frequencies are sensitive to different effective velocities $\alpha_{eff}(f)$, and will therefore have different apparent ray inclination angles (or incidence angles) $\theta(f)$.

Figure 3:
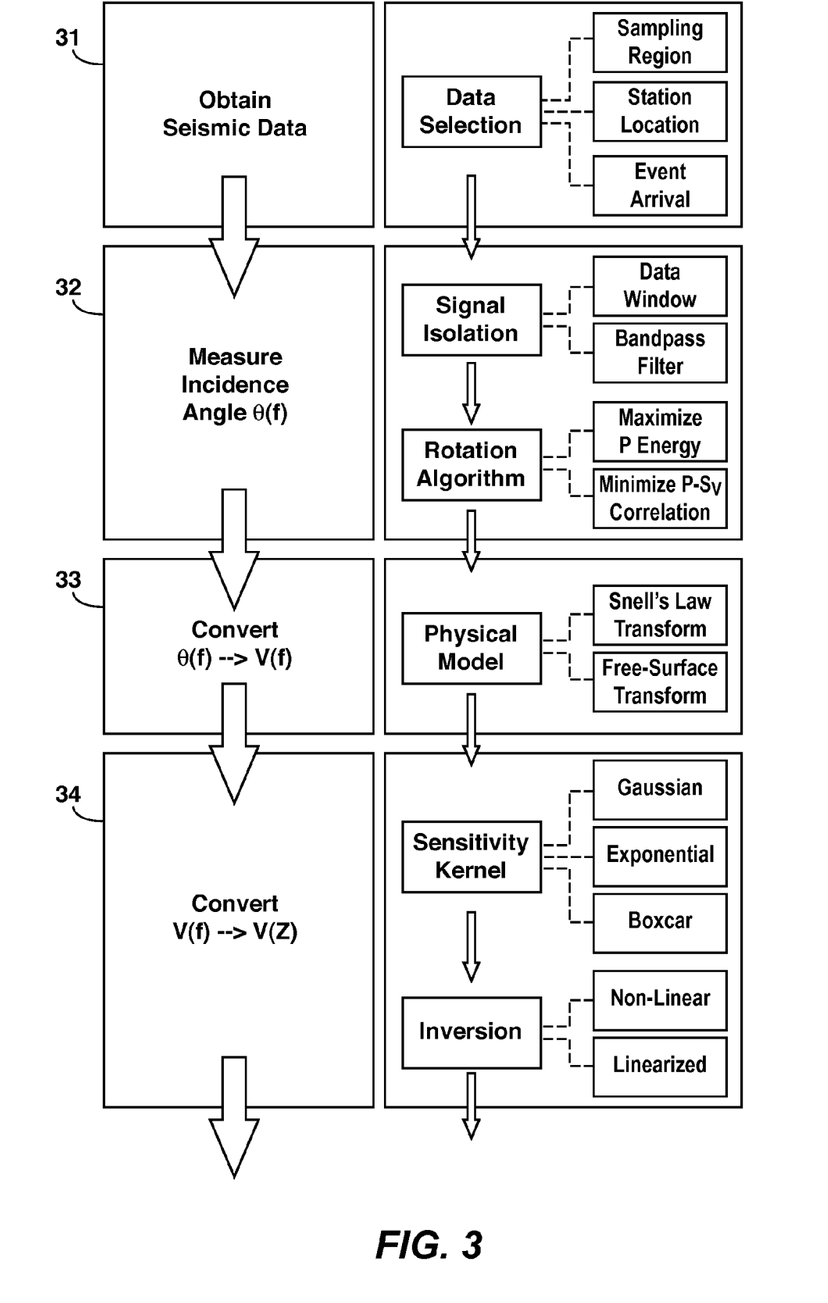
FIG. 3 is a flowchart showing basic steps in one embodiment of the present inventive method.

The method disclosed herein is a technique for measuring the apparent incidence angle of a seismic wave observed at a surface as a function of wave frequency. This apparent angle is converted to an effective velocity as a function of frequency, which is then inverted to obtain a velocity model. In at least some of its embodiments, the inventive method involves the following steps, as shown in the flowchart of FIG. 3:

At step 31, obtain seismic data recorded at instruments in the desired location.

At step 32, measure apparent incidence angle for different frequency bands.

At step 33, convert incidence angle to velocity for each frequency band.

At step 34, convert frequency-dependent velocity to depth-dependent velocity.

These four steps will next be discussed in more detail. It will be obvious to those who work in this technical field that steps 32, 33 and 34 are performed using a computer in all practical applications of the invention.

Step 31: Obtain Seismic Data

Generally, any seismic event recorded at a station (active or passive) may be used by this technique, providing the event has a known source location and the wave-front slowness can be obtained. Use of P wave arrivals yields a compressional wave velocity model, and use of S wave arrivals yields a shear wave velocity model. Final depth resolution depends strongly on the frequency content of the data.

Step 32: Measure Apparent Incidence Angle

Figure 4:
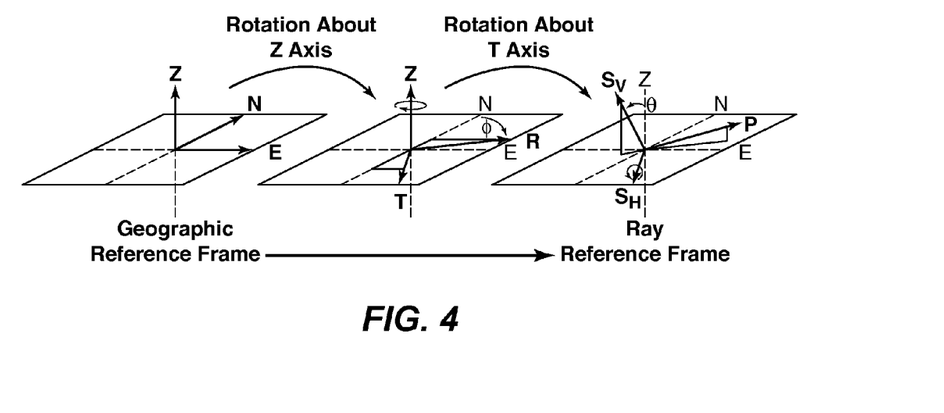
FIG. 4 is a diagram illustrating rotation from the geographic to the ray reference frame.
Figure 5:
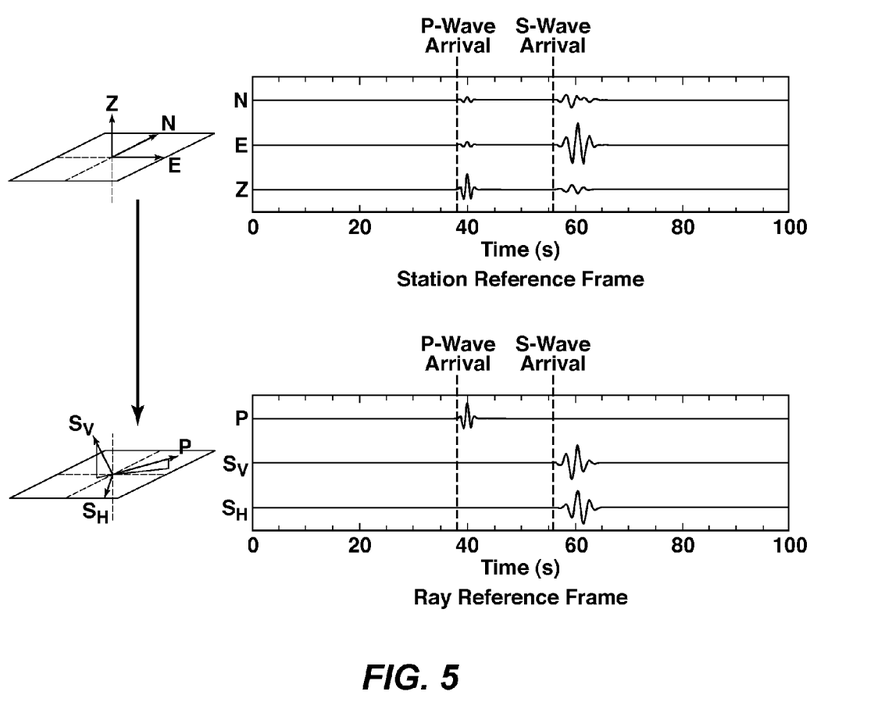
FIG. 5 shows an example of a rotated seismogram according to the present invention.

Incidence angle θ may be obtained by determining the angle necessary to rotate the station reference frame seismogram, D(N,E,Z), into the wave front reference frame seismogram D(P,$S_V$,$S_H$). Two steps may be taken: first, using the known source and receiver locations rotate D(N,E,Z) by an angle φ around the Z axis to D(R,Z,$S_H$) where the radial component R points horizontally along the great circle path between source and receiver and the transverse component $S_H$ points horizontally perpendicular to R (FIG. 4). The angle φ may be obtained from known source/receiver pair locations. Second, rotate D(R,Z,$S_H$) by an angle θ around the T/$S_H$ axis to D(P,$S_V$,$S_H$), where P points in the direction of P wave propagation, and ($S_V$,$S_H$) defines the plane of S wave propagation. This suggests how θ may be determined from the seismic data. For P waves, θ is the angle that places all seismic energy in the P direction, whereas for S waves, θ is the angle that places all seismic energy in the ($S_V$,$S_H$) plane. Examples of rotated seismograms are given in FIG. 5.

Due to the presence of random Earth and instrument noise recorded contemporaneously with the seismic event, it is impossible, in practice, to obtain a single rotation angle that results in all arriving energy E being correctly partitioned to the appropriate component. The method therefore determines the optimum arrival angle: for P waves, this is the angle that maximizes energy in the P direction; for S waves, this is the angle that minimizes energy in the P direction.

One method to quantify the energy partitioning E is simple integration (or summation) of recorded particle motion P(t) during the wave front arrival (Park et al., 1987):

$$E = \int |P(t)| \cdot dt \tag{1}$$

The rotation angle that maximizes E is the incidence angle. Another method is to compute the zero-lag cross-correlation between the P and $S_V$ components (Abt, 2010):

$$E = \int P^*(t) \cdot S_V(t) \cdot dt \tag{2}$$

In this equation, the rotation angle that minimizes E is the incidence angle. Accuracy of these measurements can be improved by the use of standard time-series techniques, for example windowing or tapering the seismic data in the vicinity of the event arrival.

Frequency dependence may be achieved by performing these calculations for seismograms that have been filtered to specific frequency bands. While individual frequencies may be used, wave form stability is enhanced by using a filter that decays smoothly from the desired central frequency. Thus, θ is obtained as a function of frequency.

Step 33: Convert Incidence Angle (θ) to Velocity (α)

Figure 6:
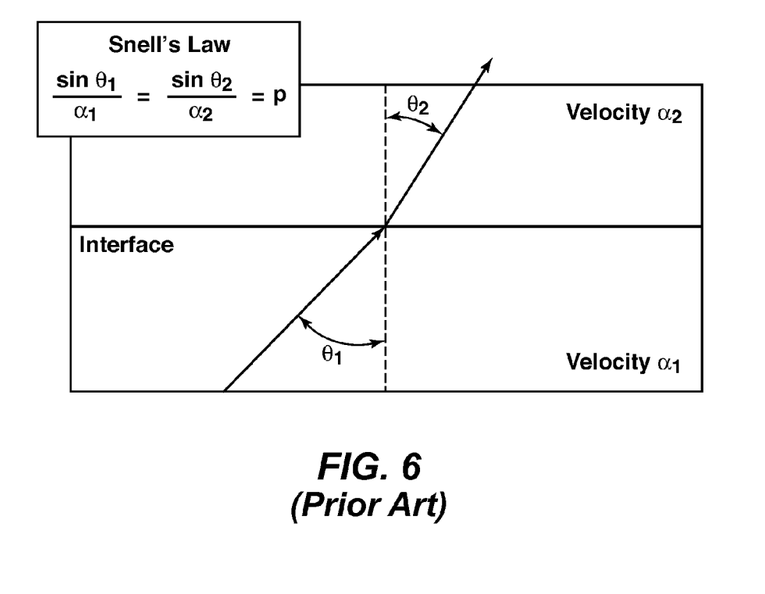
FIG. 6 is a schematic diagram illustrating Snell's law.

A physical model must be used to convert incidence angle to effective seismic velocity. For example, Snell's Law (see FIG. 6) states that the horizontal slowness p is a conserved quantity between source and receiver, i.e.:

$$p = \frac{\sin(\theta)}{\alpha} \tag{3}$$

where α is the material wave speed and θ is the incident angle of the wave front upon a material interface (as illustrated in FIG. 4). The quantity p will be known. For example, it can be obtained from freely available global catalogues and analyses of earthquakes but can also be measured between two stations and inferred in that way. Other conversion methods, i.e. other physical models that include higher order physical effects, may be used, for example the free-surface transfer matrix (Kennett, 1991):

$$\begin{bmatrix} P \\ S_V \\ S_H \end{bmatrix} = \begin{bmatrix} \frac{\beta^2 p^2 - 0.5}{\alpha q_\alpha} & \frac{p\beta^2}{\alpha} & 0 \\ p\beta & \frac{0.5 - \beta^2 p^2}{\beta q_\beta} & 0 \\ 0 & 0 & 0.5 \end{bmatrix} \cdot \begin{bmatrix} Z \\ R \\ T \end{bmatrix} \tag{4}$$

In equation 4, $q_\alpha = \sqrt{\alpha^{-2} - p^2}$ and $q_\beta = \sqrt{\beta^{-2} - p^2}$, with α and β the P and S wave speeds respectively.

Step 34: Convert Frequency-Dependent Velocity to Depth Dependent Velocity

Figure 7:
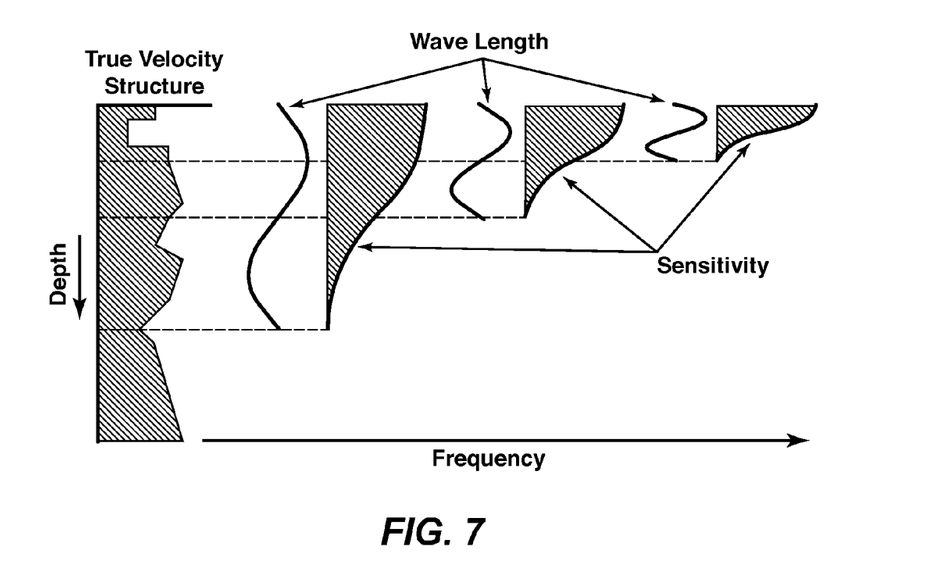
FIG. 7 is a diagram illustrating sensitivity kernels for different seismic wavelengths.

In order to convert frequency-dependent velocity to depth-dependent velocity, assumptions must be made regarding how waves of different frequencies sample the Earth:

$$\alpha_{\text{eff}}(f) = \int_{\lambda(f)} \alpha(z) \cdot G(z) \cdot dz \tag{5}$$

Where G(z) is the sensitivity kernel, α(z) is the true Earth model wave speed, and the integral is performed over a single wavelength λ(f) (See FIG. 7). The sensitivity kernels can vary depending on the order of approximation desired: for example a constant value (G=1) or decaying exponential (G(z)=exp{z/λ(f)}) may be sufficient for low-order solutions. An inversion must be performed to solve equation (5) for α(z). The inversion is done for the velocity model α(z) that best satisfies all $\alpha_{\text{eff}}(f)$. Each event can contribute information at several different frequencies. This inversion can be performed numerically by discretizing G(f,z) and $\alpha_{\text{eff}}(f)$, and inverting the following matrix equation for α(z):

$$G(f_i, z_j) \cdot \alpha(z_j) = \alpha_{\text{eff}}(f_i) \tag{6}$$

In general, the inversion is nonlinear, as λ(f)=α/f and therefore G(z) will be a function of α.

The inversion can be generalized to obtain a model for the structure sampled by any number of seismic events, with each independent measurement of $\alpha_{\text{eff}}(f)$ providing an additional constraint on the inversion solution. (As described previously, a "seismic event" can refer either to a seismic disturbance caused by a human controlled seismic source or by earthquake activity.) Further, by assigning effective velocities, i.e. measurements of $\alpha_{eff}(f)$ identified as being associated with a particular seismic event, to region sampled (or azimuth of incoming seismic energy), two and three-dimensional models can be obtained. Most inversion techniques that are capable of handling nonlinear inversions are suitable for this purpose, for example relaxation or gradient-descent methods.

The inference of subsurface properties via the method disclosed herein can be further constrained by the addition of additional geophysical constraints, for example gravity measurements via a relationship between velocity and density. Additionally, the inventive method can be extended to time-lapse applications by windowing the data by time such that a velocity model is inferred from data recorded over one time-period and then a separate model is inferred from data recorded over a later time-period.

Naturally occurring teleseismic (greater than 3000 km away) earthquakes may be used for this analysis. These seismic sources may be preferable as these events have dominant energy in the 0.1 to 5 Hz frequency band, providing resolution complementary to the information contained in reflection data. Years of study by the academic community allow for accurate source location and predicted event arrival times, though small errors in these parameters will contribute to errors in this analysis.

To identify a particular earthquake in the recorded seismic data, the seismic data may be widowed around the arrival time predicted from a global reference model (for example, IASP91 [Kennett & Engdahl, 1991] or PREM [Dziewonski & Anderson, 1981]) with a Gaussian filter of width 2λ. The reference model also provides the slowness p used in the calculations. A grid-search technique may be used to determine the effective incidence angle, where correlation between the P and $S_V$ components of the seismogram is minimized. A real Gaussian filter of width 0.5 Hz maybe used to bandpass the signal.

EXAMPLE

Figure 8:
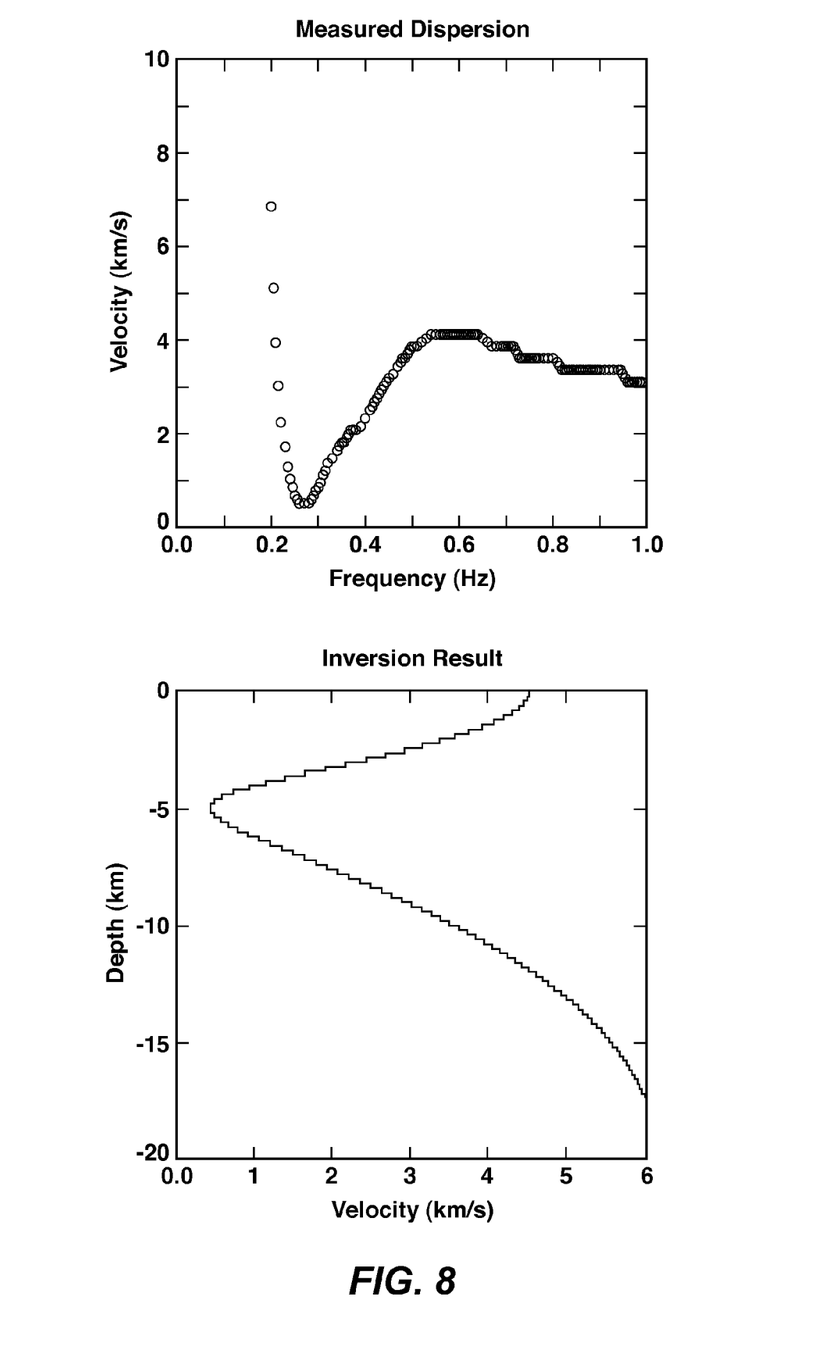
FIG. 8 shows dispersion and inversion results for an example application of the present inventive method.

In FIG. 8, results of using the present inventive method on a real seismic event are shown. The left panel shows the velocities obtained via Snell's Law as a function of frequency. The right panel shows an inversion result using these velocities where the inversion is an iterative least-squares relaxation technique.

The foregoing patent application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

REFERENCES

Abt, .D. L., K. M. Fischer, S. W. French, H. A. Ford, H. Yuan, and B. Romanowicz, "North American lithospheric discontinuity structure imaged by Ps and Sp receiver functions," *J. Geophys. Res.*, in press (2010).

Dziewonski A, and D. Anderson, "Preliminary Reference Earth Model," *Phys. Earth Planet. Int.*, 25(4) 297-356 (1981).

Park, J, F. L. Vernon, and C. R. Lindberg, "Frequency dependent polarization analysis of high frequency seismograms," *J. geophys. Res.* 92(B12), 12,664-12,674 (1987).

Kennett, B. L. N., "The removal of free surface interactions from three-component seismograms," *Geophys. J. Int.* 104, 153-163 (1991).

Sheriff, R. E. and L. P. Geldart, *Exploration Seismology*, p 134-134 (1982).

What is claimed is:

1. A method for estimating a depth-dependent model of seismic velocity in a subsurface region from seismic data recorded on 3-component instruments, comprising using a computer to:
   determine a wave front incidence angle for a selected seismic event in the seismic data at a plurality of frequencies or frequency bands;
   determine a frequency dependent velocity from the wave front incidence angle for each frequency or frequency band; and
   estimate a depth-dependent model of seismic velocity by inverting the frequency-dependent velocity.

2. The method of claim 1, wherein, in determining a frequency dependent velocity, a selected physical model is used to convert incidence angle to effective seismic velocity.

3. The method of claim 1, wherein, in inverting the frequency dependent velocity, a selected sensitivity kernel is used to describe how waves of different frequencies sample the Earth.

4. The method of claim 3, wherein the sensitivity kernel defines sensitivity as a function of depth for different frequencies.

5. The method of claim 1, wherein the seismic data represent P-wave, S-wave or surface-wave arrivals.

6. The method of claim 1, further comprising windowing the seismic data in arrival time to isolate the selected seismic event before determining the wave front incidence angle.

7. The method of claim 1, further comprising using more than one seismic event to constrain the inversion.

8. The method of claim 7, further comprising obtaining depth-dependent models for subsets of seismic events passing through different geographic regions, resulting in a 1D, 2D, or 3D velocity model.

9. The method of claim 1, further comprising applying said method to seismic data from two or more receiver stations at different geographical locations, resulting in a 1D, 2D, or 3D velocity model.

10. The method of claim 1, further comprising repeating the method for a plurality of seismic events recorded over a period of time, and grouping the seismic events according to arrival time, and identifying time-lapse differences in obtained velocity models.

11. The method of claim 6, wherein the data windowing is performed with a Gaussian or box-car function with a width being a multiple of the wave's period.

12. The method of claim 6, wherein a band pass filter is applied before data windowing.

13. The method of claim 1, wherein the wave front incidence angle is found by determining a rotation angle that rotates a survey station reference frame seismogram into a wave front reference frame seismogram.

14. The method of claim 13, wherein the rotation angle is determined either as an angle that maximizes P-wave or S-wave energy as determined by integration of a P or S component signal in the seismic data, or an angle that minimizes cross-correlation between P and $S_V$ components of the seismic data.

15. The method of claim 2, wherein the selected physical model is either Snell's Law or is based on a free-surface transfer matrix or other stress or momentum surface boundary condition.

16. The method of claim 3, wherein the sensitivity kernel is one of a group consisting of box-cars, decaying exponentials, and Gaussians with widths being multiples of wave period.

17. The method of claim 1, wherein a non-linear iterative inversion solver is used to infer the seismic velocity model.

18. The method of claim 1, further comprising using a model length constraint or a regularization constraint or another constraint in the inverting.

19. A method for migrating seismic reflection data to obtain a depth image of a subsurface region, comprising using a method of claim 1 to obtain a velocity model of the subsurface region, then using the velocity model to migrate the seismic reflection data.

20. A method for producing hydrocarbons, comprising:
conducting a seismic survey of a subsurface region using 3-component seismic receivers;
obtaining migrated seismic reflection data generated from the seismic survey using a depth-dependent model of seismic velocity for the subsurface region produced by steps comprising:
determining a wave-front incidence angle for a selected seismic event in the seismic reflection data at a plurality of frequencies or frequency bands;
determining a frequency-dependent velocity from the wave-front incidence angle for each frequency or frequency band; and
estimating a depth-dependent model of seismic velocity by inverting the frequency-dependent velocity;
interpreting the migrated seismic reflection data for presence of hydrocarbons, and drilling a well based at least partly on said interpretation, and producing hydrocarbons from the well.

21. A computer program product, comprising a non-transitory computer usable medium having a computer readable program code embodied therein, said computer readable program code adapted to be executed to implement a method for estimating a depth-dependent model of seismic velocity in a subsurface region from seismic data recorded on 3-component instruments, said method comprising:
determining a wave front incidence angle for a selected seismic event in the seismic data at a plurality of frequencies or frequency bands;
determining a frequency dependent velocity from the wave front incidence angle for each frequency or frequency band; and
estimating a depth-dependent model of seismic velocity by inverting the frequency-dependent velocity.

22. The method of claim 3, further comprising using the frequency-dependent velocity and the sensitivity kernel as a constraint on inversion of other geophysical data.

* * * * *